(12) United States Patent
Xiao

(10) Patent No.: US 9,904,118 B2
(45) Date of Patent: *Feb. 27, 2018

(54) FRAME SEALANT, PROCESS FOR PREPARING SAME, AND LIQUID CRYSTAL DISPLAY PANEL AND LIQUID CRYSTAL DISPLAY CONTAINING SAME

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Ang Xiao, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 878 days.

This patent is subject to a terminal disclaimer.

(21) Appl. No.: 14/236,175

(22) PCT Filed: Dec. 16, 2013

(86) PCT No.: PCT/CN2013/089603
§ 371 (c)(1),
(2) Date: Jan. 30, 2014

(87) PCT Pub. No.: WO2014/201825
PCT Pub. Date: Dec. 24, 2014

(65) Prior Publication Data
US 2016/0252761 A1     Sep. 1, 2016

(30) Foreign Application Priority Data
Jun. 18, 2013  (CN) .......................... 2013 1 0240567

(51) Int. Cl.
*G02F 1/1339* (2006.01)
*C09J 4/00* (2006.01)
(Continued)

(52) U.S. Cl.
CPC .............. *G02F 1/1339* (2013.01); *C09J 4/00* (2013.01); *C09J 133/08* (2013.01); *C09J 133/14* (2013.01);
(Continued)

(58) Field of Classification Search
CPC . C09J 133/08; C09J 133/14; G02F 1/133514; G02F 1/1339; G02F 2202/023;
(Continued)

(56) References Cited

U.S. PATENT DOCUMENTS 9,227,906 B2 * 1/2016 Xiao ....................... C07C 67/26
9,540,534 B2 * 1/2017 Xiao ........................ C09J 4/06
(Continued)

FOREIGN PATENT DOCUMENTS

CN         101481466 A  *  7/2009  ............... C08J 5/20
CN         102337099 A        2/2012
(Continued)

OTHER PUBLICATIONS

First Chinese Office Action for Chinese Application No. 2013102405671 dated Feb. 17, 2014.
(Continued)

*Primary Examiner* — Eli D Strah
(74) *Attorney, Agent, or Firm* — Banner & Witcoff, Ltd.

(57) ABSTRACT

A frame sealant and a process for preparing the same, and a liquid crystal display panel and a liquid display containing the frame sealant. The frame sealant comprises a curing
(Continued)

resin, an anion exchange resin, a photoinitiator, a heat curing agent, a coupling agent, an organic filler, and an inorganic filler.

12 Claims, 2 Drawing Sheets

(51) Int. Cl.
*C09J 133/08* (2006.01)
*C09J 133/14* (2006.01)
*G02F 1/1335* (2006.01)

(52) U.S. Cl.
CPC .. *B32B 2457/202* (2013.01); *G02F 1/133514* (2013.01); *G02F 2202/023* (2013.01); *Y10T 428/1059* (2015.01); *Y10T 428/1073* (2015.01)

(58) Field of Classification Search
CPC ......... Y10T 428/1059; Y10T 428/1073; B32B 2457/202
See application file for complete search history.

(56) References Cited

U.S. PATENT DOCUMENTS

| | | | | |
|---|---|---|---|---|
| 2010/0022745 | A1* | 1/2010 | Takeuchi | C08F 283/10 528/421 |
| 2014/0078457 | A1 | 3/2014 | Xiao et al. | |
| 2015/0225631 | A1* | 8/2015 | Xiao | C08F 22/10 349/106 |
| 2015/0252208 | A1* | 9/2015 | Xiao | C09J 4/06 522/44 |
| 2015/0321189 | A1* | 11/2015 | Miyamura | B01J 41/10 428/76 |
| 2016/0032155 | A1* | 2/2016 | Xiao | C09J 4/00 522/44 |

FOREIGN PATENT DOCUMENTS

| | | | | |
|---|---|---|---|---|
| CN | 102516889 | A | 6/2012 | |
| CN | 102766047 | A * | 11/2012 | ............. C07C 67/26 |
| CN | 102888199 | A | 1/2013 | |
| CN | 103146310 | A * | 6/2013 | ................ C09J 4/02 |
| CN | 103205216 | A * | 7/2013 | ................ C09J 4/06 |
| CN | 103305133 | A | 9/2013 | |
| CN | 103436203 | A | 12/2013 | |
| JP | H 05043866 | A * | 2/1993 | ............... C09K 3/10 |
| JP | H08-97076 | A | 4/1996 | |
| JP | H0897076 | A | 4/1996 | |

OTHER PUBLICATIONS

English translation First Chinese Office Action for Chinese Application No. 2013102405671 dated Feb. 17, 2014.
International Search Report for International Application No. PCT/CN2013/089603 dated Mar. 6, 2014.
English abstract of CN102337099A, listed above, 1 page.
Second Office Action (Chinese language) issued by the State Intellectual Property Office ("SIPO") dated Aug. 18, 2014 for International Application No. 201310240567.1, 3 pages.
English translation of second Office Action issued by SIPO for International Application No. 201310240567.1, 2 pages.
English abstract for CN102888199A.
English abstract for CN103146310A.
English abstract for CN103205216A.
English abstract for CN103305133A.
English abstract for JPH08-97076A.
Dec. 22, 2015—International Preliminary Report on Patentability Appn PCT/CN2013/089603.
Feb. 6, 2015—(CN) First Office Action Appn 201410048835.4 with English Tran.

* cited by examiner

FRAME SEALANT, PROCESS FOR PREPARING SAME, AND LIQUID CRYSTAL DISPLAY PANEL AND LIQUID CRYSTAL DISPLAY CONTAINING SAME

CROSS REFERENCE TO RELATED APPLICATIONS

This application is based on International Application No. PCT/CN2013/089603 filed on Dec. 16, 2013, which claims priority to Chinese National Application No. 201310240567.1 filed on Jun. 18, 2013, the contents of which are incorporated herein by reference.

FIELD OF INVENTION

Embodiments of the invention relates to a frame sealant, a process for preparing the same, and a liquid crystal display panel and a liquid crystal display containing the frame sealant.

BACKGROUND OF INVENTION

During the process for manufacturing a liquid crystal display (LCD), the process for manufacturing a liquid crystal display panel directly affects the quality of the liquid crystal display. The liquid crystal panel has long been manufactured primarily by liquid crystal injection. In order to improve the efficiency of the process for manufacturing the liquid crystal panel, it is usually filled by liquid crystal through dripping method. The method comprises: (1) coating a frame sealant onto a transparent substrate to form a frame for filling liquid crystal; (2) dripping fine liquid crystal droplets into the frame; (3) aligning the substrate and another substrate under vacuum with the frame sealant being in an uncured state; and (4) curing the frame sealant to form the liquid crystal panel.

In the aforesaid method, the frame sealant used is often composed of an epoxy resin having a heat curing property and a (meth)acrylate resin with a light curing property. As to this frame sealant, although a minor amount is used, it will adversely affect the liquid crystal panel. This is because it has a polarity similar to the liquid crystal, and when a uncured frame sealant is directly contacted with the liquid crystal, some components in the uncured frame sealant will be dissolved in and then contaminate the liquid crystal, thereby affecting the reliability of the liquid crystal panel.

In the current modified method, the contact time between the uncured frame sealant and the liquid crystal is often decreased to reduce the contamination caused by the impurity ions in the frame sealant entering into the liquid crystal. However, for small size products, such modified method still cannot avoid the contamination caused by the uncured frame sealant when it is contacted with the liquid crystal and enters into the liquid crystal molecules. The disclosure intends to provide a frame sealant capable of avoiding the contamination of the liquid crystal caused by uncured frame sealant and a process for preparing the same.

SUMMARY OF INVENTION

An embodiment of the invention provides a frame sealant comprising:
a curing resin, an anion exchange resin, a photoinitiator, a heat curing agent, a coupling agent, an organic filler and an inorganic filler.

The curing resin is a mixture of a low viscosity epoxy acrylate light curing resin and an epoxy resin; and the low viscosity epoxy acrylate light curing resin has a molecular structure as follows:

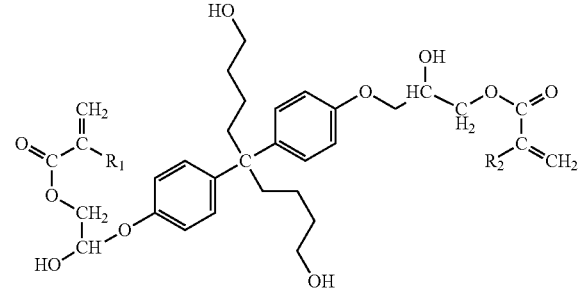

wherein $R_1$ and $R_2$ are the same or different, and both of $R_1$ and $R_2$ represent alkyls having 1 to 4 carbon atoms.

The contents by weight percentage of the low viscosity epoxy acrylate light curing resin, the epoxy resin, the anion exchange resin, the photoinitiator, the heat curing agent, the coupling agent, the organic filler and the inorganic filler in the frame sealant are:
low viscosity epoxy acrylate light curing resin 60%-70%;
epoxy resin 5%-7%;
anion exchange resin 0.8%-1.5%;
photoinitiator 0.1%-0.5%;
heat curing agent 5%-10%;
coupling agent 0.5%-1%;
organic filler 4%-8%; and
inorganic filler 5%-12%, respectively.

The anion exchange resin is a crosslinked copolymer resin having a styrene-divinylbenzene structure.

The anion exchange resin is an anion exchange resin tolerant to high temperature ranging from 120° C. to 200° C.

The anion exchange resin may comprise 1% of the total weight of the frame sealant.

An embodiment of the invention provides a process for preparing the frame sealant comprising:
Step 1: weighing and pre-mixing the curing resin, the anion exchange resin, the photoinitiator, the heat curing agent, the coupling agent, the organic filler, and the inorganic filler;
Step 2: mixing the pre-mixed raw materials to obtain a mixture;
Step 3: defoaming the mixture;
Step 4: adjusting the viscosity of the defoamed mixture;
Step 5: filtrating the mixture after viscosity adjustment to remove impurities;
Step 6: storing the mixture after filtration and impurity removal in a light-resistant vessel.

For example, Step 2 may be conducted at a temperature between 30° C.-50° C., and Step 1, Step 3 to Step 6 may be conducted at room temperature between 23° C.-25° C.

For example, the times of mixing in Step 2 may be 2 or 3, and the time for each mixing may be 15 minutes-35 minutes.

For example, the times of defoaming in Step 3 may be 2 or 3, the time for each defoaming may be 30 minutes-50 minutes, and the pressure in the defoamer is less than 200 Pa.

For example, in Step 4, the viscosity may be adjusted to a range of 150 Pa·sec-250 Pa·sec through addition of the low viscosity epoxy acrylate light curing resin.

For example, Steps 1 to 5 may be operated under a clean environment with a cleanliness class of 10,000, and Step 6 may be operated under a clean environment with a cleanliness class of 1,000.

An embodiment of the invention provides a liquid crystal display panel comprising an array substrate and a color filter substrate, wherein the aforesaid frame sealant is disposed between the array substrate and the color filter substrate.

An embodiment of the invention provides a liquid crystal display comprising the aforesaid liquid crystal panel.

DESCRIPTION OF DRAWINGS

In order to more clearly illustrate the technical solutions of the embodiments of the invention or the prior art, the figures to be used for the description of the embodiments or the prior art are briefly introduced below. Apparently, the figures in the following description represent merely some examples of the invention. for a person of ordinary skill in the art, other figures can be obtained based on these figures without paying inventive work.

DETAILED DESCRIPTION OF INVENTION

Figure 1:
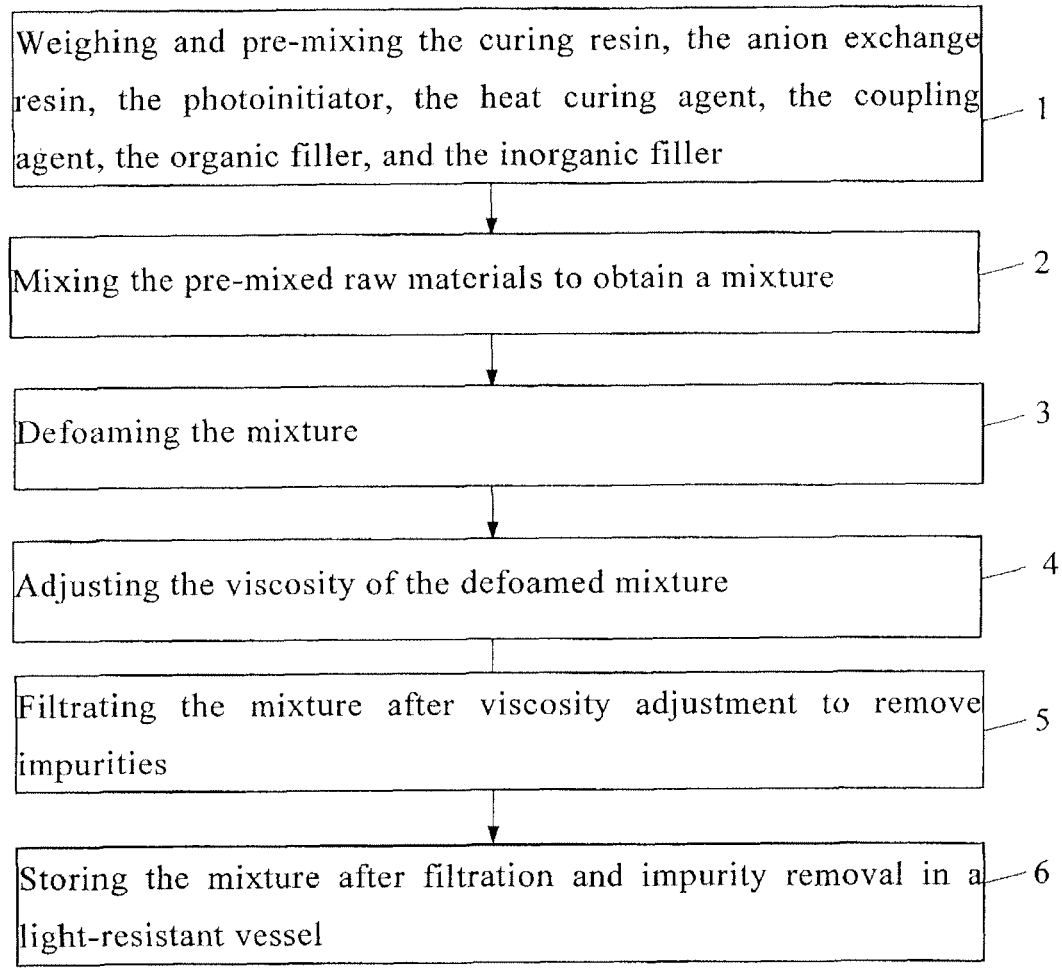
FIG. 1 is a flow chart for the process for preparing the frame sealant in the invention.

The technical solutions of the embodiments of the invention will be described in a clear and complete manner below with reference to the figures in the invention. Apparently, the embodiments described are merely some, rather than all embodiments of the invention. Any other embodiment obtained by a person of ordinary skill in the art on the basis of the embodiments of the invention without paying inventive work will fall into the scope of the invention.

The frame sealant provided by the embodiments of the invention and the process for preparing the same, the liquid crystal display panel and the liquid crystal display containing the frame sealant will be described in more details below with reference to the figures.

The embodiment of the invention provides a frame sealant comprising a curing resin, an anion exchange resin, a photoinitiator, a heat curing agent, a coupling agent, an organic filler, and an inorganic filler.

The anion exchange resin can well adsorb the impurity ions and small molecules existing in the frame sealant. When a uncured frame sealant is directly contacted with a liquid crystal, the anion exchange resin in the frame sealant can adsorb the impurity ions and small molecules in the frame sealant to prevent the impurity ions and small molecules from entering into the liquid crystal and causing contamination to it.

For example, the anion exchange resin may be a crosslinked copolymer resin having a styrene-divinylbenzene structure. Because it has a polarity similar to the low viscosity epoxy acrylate light curing resin, it can be mixed well therein. The examples of the anion exchange resin comprise, for example, but are not limited to, macroporous weak alkaline styrene anion exchange resin available from the Hebei Huazhong Chemical Industry Co. Ltd. The anion exchange resin as used herein may also be an anion exchange resin which can be tolerant to a high temperature ranging from 120° C. to 200° C. The example thereof may comprise but is not limited to a chloro-type D206 resin available from Xi'an Electric Resin Plant. Because during the process of later ultraviolet radiation and light curing, the highest temperature of the frame sealant will not exceed 120° C., selecting an anion exchange resin within such temperature range enables the frame sealant to have a stable performance in the later processing and thus adsorb the impurity ions and small molecules better.

The photoinitiator is an alkyl phenone compound and may be selected from any one of $\alpha,\alpha$-diethoxyacetophenone, $\alpha$-hydroxyalkylphenone, and $\alpha$-aminoalkylphenone. The heat curing agent may be a polyamine. The coupling agent may be a silane coupling agent, such as $\gamma$-aminopropyltriethoxysilane. The inorganic filler may be a surface treated silica sphere with a diameter of about 1.0 μm-2.0 μm The organic filler may be an elastic rubber sphere with a diameter of about 0.1 μm-1.0 μm.

The frame sealant of the embodiment of the invention comprises the anion exchange resin which is capable of adsorbing impurity ions and small molecules well. When the uncured frame sealant is directly contacted with the liquid crystal, it can prevent the impurity ions and small molecules in the frame sealant from entering the liquid crystal and causing contamination to it, thereby well improving the display effect and shell life of the liquid crystal display panel and increasing the quality of the liquid crystal display.

For example, the curing resin is a mixture of a low viscosity epoxy acrylate light curing resin and an epoxy resin; and the low viscosity epoxy acrylate light curing resin has a molecular structure as follows:

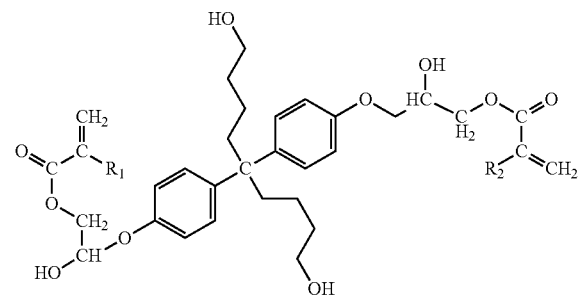

wherein $R_1$ and $R_2$ are the same or different, and both of $R_1$ and $R_2$ represent alkyls having 1-4 carbon atoms.

The aforesaid alkyl having 1-4 carbon atoms can be selected from methyl, ethyl, propyl, isopropyl, butyl, isobutyl, or t-butyl.

The low viscosity epoxy acrylate light curing resin can be obtained by reacting an epoxy resin with an alkyl acrylate resin.

For example, the alkyl group in the alkyl acrylate resin is an alkyl group having steric effect, such as t-butyl and the like. Thus, the low viscosity epoxy acrylate light curing resin obtained from the reaction will also have good steric effect, thereby reducing the twist of the long chain in the polymer in space and increasing the rigidity of the frame sealant before curing. When the liquid crystal is dripped into the area enclosed by the frame sealant and contacted with the uncured frame sealant, the uncured frame sealant can well resist the impact caused by dripping the liquid crystal, thereby avoiding the deformation itself, as well as the contamination to the liquid crystal caused by the deformation which will allow external impurity ions to enter the frame sealant.

The epoxy resin may be any epoxy resin known in the art for this purpose. For example, the epoxy resin used may include, but is not limited to a commercially available E-41/E-51 bisphenol A epoxy resin.

The contents by weight percentage of the low viscosity epoxy acrylate light curing resin, the epoxy resin, the anion exchange resin, the photoinitiator, the heat curing agent, the coupling agent, the organic filler and the inorganic filler in the frame sealant of the embodiment of the invention are:

low viscosity epoxy acrylate light curing resin 60%-70%;

epoxy resin 5%-7%;

anion exchange resin 0.8%-1.5%;

photoinitiator 0.1%-0.5%;

heat curing agent 5%-10%;

coupling agent 0.5%-1%;

organic filler 4%-8%; and inorganic filler 5%-12%, respectively.

The embodiment of the invention provides a frame sealant composition, wherein the content of the low viscosity epoxy acrylate light curing resin in the frame sealant is usually 60 wt %-70 wt %. When its content is less than 60 wt %, the heat curing reaction will slow down. Thus, when manufactured by using a liquid crystal dripping process, the frame sealant will have a reduced viscosity caused by the heat expansion of the liquid crystal, causing the frame sealant to break. When its content is more than 70 wt %, the frame sealant cannot reach sufficient adhesion strength. Moreover, the content of the epoxy resin in the frame sealant is usually 5 wt %-7 wt %. When its content is less than 5 wt %, its adhesion strength is weakened, while when its content is more than 7 wt %, it is prone to break due to the slow heat curing reaction. Another component in the composition is the anion exchange resin, which is a cross-linked copolymer resin having a styrene-divinylbenzene structure usually in an amount of 0.8 wt %-1.5 wt %, primarily for the purpose of adsorbing the impurity ions and small molecules in the frame sealant.

The frame sealant provided in the embodiment of the invention not only can well improve the rigidity of the uncured frame sealant and avoid the deformation of the frame sealant and thus the contamination caused by the deformation which allows external impurity ions to enter the frame sealant, but also can better adsorb the impurity ions and small molecules in the frame sealant and prevent them from entering into the liquid crystal and causing contamination to it, thereby more efficiently improving the quality of the liquid crystal panel.

The embodiment of the invention further provides a process for preparing the aforesaid frame sealant. As shown in FIG. 1, the process comprises the following steps:

Step 1: The curing resin, the anion exchange resin, the photoinitiator, the heat curing agent, the coupling agent, the organic filler, and the inorganic filler are weighed and pre-mixed.

The curing resin in this step can be a mixture of a low viscosity epoxy acrylate light curing resin and an epoxy resin; and the low viscosity epoxy acrylate light curing resin has a molecular structure as follows:

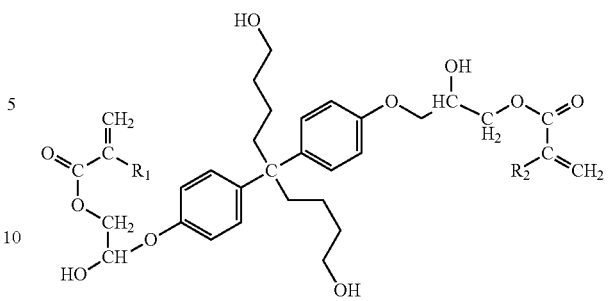

wherein $R_1$ and $R_2$ are the same or different, and both of $R_1$ and $R_2$ represent alkyls having 1-4 carbon atoms.

For example, in this step, low viscosity epoxy acrylate light curing resin 60%-70%, epoxy resin 5%-7%, anion exchange resin 0.8%-1.5%, photoinitiator 0.1%-0.5%, heat curing agent 5%-10%, coupling agent 0.5%-1%, organic filler 4%-8% and inorganic filler 5%-12% by weight of the total weight of the frame sealant are weighted and added into an banbury mixer for pre-mixing.

It should be understood that the contents of the components in the embodiment of the invention are the preferable formulation of the frame sealant, which, however, are not limited to those. A person skilled in the art can determine or adjust the weight percentage of the aforesaid components based on the disclosure of the present invention as well as common knowledge or conventional technical means in the art.

Step 2: The pre-mixed raw materials are mixed to obtain a mixture.

In the step, the pre-mixed raw materials are added into a banbury mixer for mechanical mixing to achieve a homogeneous and dispersed state. For example, the temperature range of the step may be controlled within 30° C.-50° C., the times for mixing may be 2 or 3, and the time of each mixing may be 15 minutes-35 minutes, so as to allow the raw materials to achieve a better mixed state.

It should be understood that the invention is not limited to this. A person skilled in the art can determine or adjust the aforesaid times of mixing and mixing time based on the disclosure of the present invention as well as common knowledge or conventional technical means in the art, or the weight of the frame sealant required to be prepared. For example, if the weight of the frame sealant required to be prepared is large, the times of mixing and the mixing time may be increased to allow it to mix thoroughly.

Step 3: The mixture is subjected to defoaming.

In the step, the mixture obtained above is placed into the defoamer for defoaming to remove the bubbles in the mixture so as to allow the mixture to achieve a thorough mixing and dispersion. For example, the times of defoaming may be 2 or 3, the time of each defoaming may be 30 minutes-50 minutes, and the pressure in the defoamer is less than 200 Pa.

It should be understood that the invention is not limited to this. A person skilled in the art can determine or adjust the aforesaid times of defoaming and defoaming time based on the disclosure of the present invention as well as common knowledge or conventional technical means in the art.

Step 4: The defoamed mixture is subjected to viscosity adjustment.

In this step, the viscosity may be adjusted by adding the low viscosity epoxy acrylate light curing resin. The viscosity of the mixture after adjustment is in the range of 150

Pa·sec-250 Pa·sec. The viscosity adjustment is crucial to the quality of the frame sealant. The subsequent steps can not be continued until the mixture reaches a viscosity of said range. If the mixture exceeds or fails to reach said viscosity range, the frame sealant should be re-prepared.

Step 5: The mixture after viscosity adjustment is filtrated to remove impurities.

This step will remove the insolubles in the mixture so as to make the mixture smooth and fine as a whole. For example, the times of filtration may be 2.

It should be understood that the invention is not limited to this. A person skilled in the art can determine or adjust the times of aforesaid filtration process based on the disclosure of the present invention as well as common knowledge or conventional technical means in the art.

Step 6: The mixture after filtration and impurity removal is stored in a light-resistant vessel.

In this step, the prepared frame sealant is sealed for preservation, so that it will not be contaminated before the manufacture of the liquid crystal panel. For example, this step may be operated under a clean environment with a cleanliness class of 1,000.

Steps 1 to 5 may be operated under a clean environment with a cleanliness class of 10,000.

It should be noted that in the aforesaid process for manufacturing the frame sealant, only Step 2 is conducted within a temperature range of 30° C.-50° C., and other steps are all conducted under room temperature of 23° C.-25° C.

In the process for preparing the frame sealant of the invention, an anion exchange resin is added to the frame sealant. When the uncured frame sealant is directly contacted with the liquid crystal, the impurity ions and small molecules in the frame sealant can be adsorbed by the anion exchange resin so as to prevent them from entering into the liquid crystal and causing contamination, thereby more efficiently improving the display effect and shelf life of the liquid crystal display panel. In addition, as compared to the prior process for preparing the frame sealant, the present process needs a shorter heat curing time and has the advantage of rapid curing, thereby improving the process efficiency and reducing the cost.

The embodiment of the invention further provides a liquid crystal panel comprising an array substrate and a color filter substrate, with the frame sealant disposed between the array substrate and the color filter substrate. For the liquid crystal display panel provided in the embodiment of the invention, the rigidity and the adsorptive effect on impurity ions of the frame sealant have been reinforced, which will prevent the frame sealant from contaminating the liquid crystal upon contacting with it, thereby improving the performance of the liquid crystal panel.

The embodiment of the invention further provides a liquid crystal display comprising the aforesaid liquid crystal display panel. For the liquid crystal display provided in the invention, the rigidity and the adsorptive effect on impurity ions of the frame sealant disposed between the color filter substrate and the array substrate in the liquid crystal panel have been reinforced, which will prevent the frame sealant from contaminating the liquid crystal upon contacting with it, thereby improving the performance of the liquid crystal panel, and in turn, improving the quality of the liquid crystal display.

In order to illustrate the frame sealant and the process for preparing the same, and the liquid crystal display panel and the liquid crystal display containing the frame sealant better, detailed descriptions are provided with reference to the following specific examples. Unless indicated otherwise, all amounts of the components in the examples are by weight percentage.

Example 1

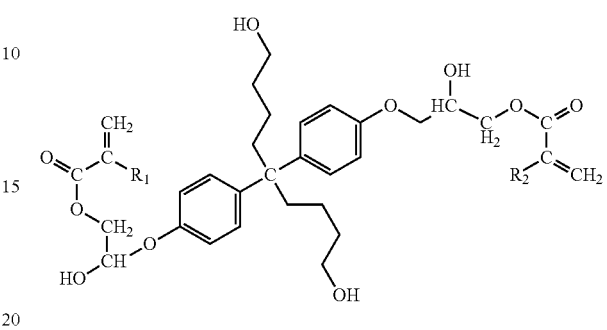

At a temperature of 23° C., a low viscosity epoxy acrylate light curing resin (both $R_1$ and $R_2$ are methyl) 60%, an epoxy resin (E-51, Beijing Jintongletai Chemical Product Co. Ltd.) 7%, an anion exchange resin (a macroporous weak alkaline styrene anion exchange resin, Hebei Huazhong Chemical Industry Co. Ltd.) 1.5%, a photoinitiator (α,α-diethoxyphenone, Shanghai Zhixin Chemical Industry Co. Ltd.) 0.5%, a heat curing agent (N,N-dimethylaminopropylamine, Shanghai Rongrong Chemical Industry Co. Ltd.) 10%, a coupling agent (KH550, γ-aminopropyltriethoxysilane ($NH_2(CH_2)_3Si(OCH_2CH_3)_3$), Guangzhou Zhongjie Chemical Technology Co. Ltd.) 1%, an organic filler (an organic silicon microsphere, MSE, USA, with a diameter of 0.1 μm-1.0 μm) 8% and an inorganic filler (a silica sphere, Natoco, Japan, with a diameter of 1.0 μm-2.0 μm) 12% are weighed, respectively, and pre-mixed. The aforesaid pre-mixed raw materials are added into a banbury mixer and mixed for three times at a controlled temperature of about 35° C.-40° C., 15 minutes each. At a temperature of 23° C., the mixture obtained after the mixing is placed in a defoamer under a pressure less than 200 Pa for defoaming twice, 30 minutes each. The defoamed mixture is adjusted for viscosity by adding the low viscosity epoxy acrylate light curing resin. After the adjustment, the viscosity of the mixture reaches 180 Pa·sec. The mixture after viscosity adjustment is subjected to filtration to remove the impurities, and finally placed into a polyethylene bottle for storage.

Example 2

At a temperature of 25° C., the low viscosity epoxy acrylate light curing resin as Example 1 67%, an epoxy resin (E-51, Beijing Jintongletai Chemical Product Co. Ltd.) 6.5%, an anion exchange resin (a macroporous weak alkaline styrene anion exchange resin, Hebei Huazhong Chemical Industry Co. Ltd.) 1.3%, a photoinitiator (α,α-diethoxyphenone, Shanghai Zhixin Chemical Industry Co. Ltd.) 0.4%, a heat curing agent (N,N-dimethylaminopropylamine, Shanghai Rongrong Chemical Industry Co. Ltd.) 9%, a coupling agent (KH550, γ-aminopropyltriethoxysilane ($NH_2(CH_2)_3Si(OCH_2CH_3)_3$), Guangzhou Zhongjie Chemical Technology Co. Ltd.) 0.8%, an organic filler (an organic silicon microsphere, MSE, USA, with a diameter of 0.1 μm-1.0 μm) 6% and an inorganic filler (a silica sphere, Natoco, Japan, with a diameter of 1.0 μm-2.0 μm) 9%, are weighed, respectively, and pre-mixed. The aforesaid pre-mixed raw materials are added into a banbury mixer and mixed for three times at a controlled temperature of about 40° C., 20 minutes each. At a temperature of 25° C., the mixture obtained after the mixing is placed in a defoamer under a pressure less than 200 Pa for defoaming twice, 30 minutes each. The defoamed mixture is adjusted for viscosity by adding the low viscosity epoxy acrylate light curing resin. After the adjustment, the viscosity of the mixture reaches 200 Pa·sec. The mixture after viscosity adjustment is subjected to filtration to remove the impurities, and finally placed into a polyvinyl chloride bottle for storage.

Example 3

At a temperature of 24° C., the low viscosity epoxy acrylate light curing resin as Example 1 70%, an epoxy resin (E-51, Beijing Jintongletai Chemical Product Co. Ltd.) 6%, an anion exchange resin (a macroporous weak alkaline styrene anion exchange resin, Hebei Huazhong Chemical Industry Co. Ltd.) 1%, a photoinitiator (α,α-diethoxyphenone, Shanghai Zhixin Chemical Industry Co. Ltd.) 0.3%, a heat curing agent (N,N-dimethylaminopropylamine, Shanghai Rongrong Chemical Industry Co. Ltd.) 8%, a coupling agent (KH550, γ-aminopropyltriethoxysilane $(NH_2(CH_2)_3Si(OCH_2CH_3)_3)$ Guangzhou Zhongjie Chemical Technology Co. Ltd.) 0.7%, an organic filler (an organic silicon microsphere, MSE, USA, with a diameter of 0.1 μm-1.0 μm) 6% and an inorganic filler (a silica sphere, Natoco, Japan, with a diameter of 1.0 μm-2.0 μm) 8%, are weighed, respectively, and pre-mixed. The aforesaid pre-mixed raw materials are added into a banbury mixer and mixed for three times at a controlled temperature of about 45° C., 25 minutes each. At a temperature of 24° C., the mixture obtained after the mixing is placed in a defoamer under a pressure less than 200 Pa for defoaming twice, 30 minutes each. The defoamed mixture is adjusted for viscosity by adding the low viscosity epoxy acrylate light curing resin. After the adjustment, the viscosity of the mixture reaches 220 Pa·sec. The mixture after the viscosity adjustment is subjected to filtration to remove the impurities, and finally placed into a polyethylene bottle for storage.

Performance Test

The frame sealants in Examples 1-3 and a prior frame sealant (UR2920, Mitsui Chemistry) are each subjected to a contamination testing.

Onto two identical 40 mm×45 mm white glass plates, the frame sealant of the invention and the prior frame sealant are each coated at 5 mm away from the four edges of the two glass plates, with a cross section area of 4000±400 μm², and the two white glass plates with the frame sealant coated thereon are aligned under vacuum with two 36 mm×36 mm white glass plates, respectively, such that the gap between two glasses is 5 μm. After vacuum alignment, they are allowed to stand for 5 minutes followed by UV exposure (5000 mJ/cm²) and a heat curing (120° C., 1 hour), and then the contamination results are observed.

Figure 2:
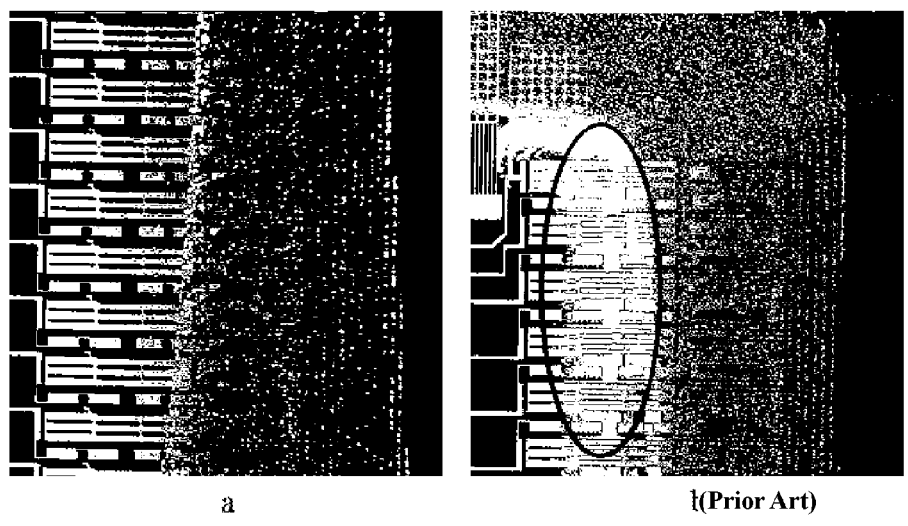
FIG. 2 is a diagram comparing the frame sealant of the embodiments of the invention and the conventional frame sealant after a contamination experiment.

FIG. 2 is a diagram comparing the frame sealant provided in the invention with the prior frame sealant after the contamination experiment. FIG. 2a is a schematic diagram showing the contact area between the frame sealant coated on the right side of the glass plate and the edge of the liquid crystals, after the glass substrate coated with the frame sealant of the invention is subjected to alignment under vacuum and allowed to stand. FIG. 2b is a schematic diagram showing the contact area between the frame sealant coated on the right side of the glass plate and the edge of the liquid crystals, after the glass substrate coated with the prior frame sealant is subjected to alignment under vacuum and allowed to stand. In FIG. 2a, on the left side are the liquid crystals and on the right side is the frame sealant of the present invention. It can be seen that the liquid crystal region and the frame sealant region are demarcated clearly and the frame sealant on the right side does not contaminate the liquid crystals on the left side. In FIG. 2b, on the left side are the liquid crystals and on the right side is the prior frame sealant. It can be seen that the liquid crystal region and the frame sealant region are not demarcated clearly and the frame sealant on the right side partially permeates into the liquid crystal region, where the region marked by the black ellipse shows the contaminated liquid crystal region when the prior frame sealant contacts with the liquid crystals.

It can be seen that compared to the prior frame sealant shown in FIG. 2b, the contamination at the interface between the frame sealant of the present invention and the liquid crystals as shown in FIG. 2a is efficiently reduced due to the addition of the anion exchange resin to the frame sealant.

The above descriptions are merely specific embodiments of the invention. However, the scope of the invention is not limited to this. Any person skilled in the art can readily envision variations or substitutions based on the technical disclosure of the present invention, which should be encompassed in the scope of the invention. Therefore, the scope of the invention will be determined by the appended claims.

What is claimed is:

1. A frame sealant comprising: a curing resin, an anion exchange resin, a photoinitiator, a heat curing agent, a coupling agent, an organic filler and an inorganic filler,
wherein the curing resin is a mixture of a low viscosity epoxy acrylate light curing resin and an epoxy resin; and the low viscosity epoxy acrylate light curing resin has a molecular structure as follows:

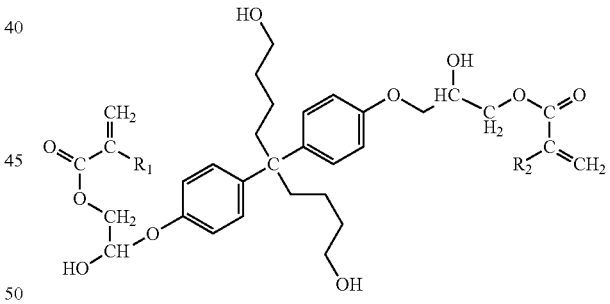

wherein $R_1$ and $R_2$ are the same or different, and both of $R_1$ and $R_2$ represent alkyls having 1-4 carbon atoms.

2. The frame sealant according to claim 1, wherein the contents by weight percentage of the low viscosity epoxy acrylate light curing resin, the epoxy resin, the anion exchange resin, the photoinitiator, the heat curing agent, the coupling agent, the organic filler and the inorganic filler in the frame sealant are:
low viscosity epoxy acrylate light curing resin 60%-70%;
epoxy resin 5%-7%;
anion exchange resin 0.8%-1.5%; photoinitiator 0.1%-0.5%;
heat curing agent 5%-10%;
coupling agent 0.5%-1%;
organic filler 4%-8%; and
inorganic filler 5%-12%, respectively.

3. The frame sealant according to claim 1, wherein the anion exchange resin is a crosslinked copolymer resin having a styrene-divinylbenzene structure.

4. The frame sealant according to claim 1, wherein the anion exchange resin is an anion exchange resin tolerant to a high temperature ranging from 120° C. to 200° C.

5. The frame sealant according to claim 2, wherein the anion exchange resin comprises 1% of the total weight of the frame sealant.

6. A process for preparing the frame sealant according to claim 1, comprising:
   Step 1: weighing and pre-mixing the curing resin, the anion exchange resin, the photoinitiator, the heat curing agent, the coupling agent, the organic filler, and the inorganic filler;
   Step 2: mixing the pre-mixed materials of Step 1 to obtain a mixture;
   Step 3: defoaming the mixture;
   Step 4: adjusting the viscosity of the defoamed mixture;
   Step 5: filtrating the mixture after viscosity adjustment to remove impurities; and
   Step 6: storing the mixture after filtration and impurity removal in a light-resistant vessel.

7. The process according to claim 6, wherein Step 2 is conducted at a temperature between 30° C.-50° C., and Step 1, Step 3 to Step 6 are conducted at room temperature between 23° C.-25° C.

8. The process according to claim 6, wherein the mixing in Step 2 is repeated 2 or 3 times, and the time of each mixing is 15 minutes-35 minutes.

9. The process according to claim 6, wherein the defoaming in Step 3 is repeated 2 or 3 times, the time of each defoaming is 30 minutes-50 minutes, and the defoaming pressure is less than 200 Pa.

10. The process according to claim 6, wherein in Step 4, the defoamed mixture is adjusted for viscosity by adding the low viscosity epoxy acrylate light curing resin, with the viscosity of the mixture after adjustment falls in the range of 150 Pa-sec-250 Pa sec.

11. A liquid crystal display panel comprising an array substrate and a color filter substrate, wherein the frame sealant according to claim 1 is disposed between the array substrate and the color filter substrate.

12. A liquid crystal display comprising the liquid crystal panel according to claim 11.

* * * * *